United States Patent [19]

Mani

[11] Patent Number: 4,521,494

[45] Date of Patent: Jun. 4, 1985

[54] STYRENE-ACRYLIC LATEX CONTAINING A HETERO-UNSATURATED MONOMER AND PAPER-COATING COMPOSITIONS PRODUCED THEREFROM

[75] Inventor: Inder Mani, Midland, Mich.

[73] Assignee: The Dow Chemical Company, Midland, Mich.

[21] Appl. No.: 543,550

[22] Filed: Oct. 19, 1983

Related U.S. Application Data

[63] Continuation-in-part of Ser. No. 384,812, Jun. 3, 1982, abandoned.

[51] Int. Cl.$^3$ .............................................. C08L 33/02
[52] U.S. Cl. .................................... 428/514; 524/554; 524/560; 524/561; 526/327
[58] Field of Search ....................... 524/554, 560, 561; 526/327; 428/511, 514

[56] References Cited

U.S. PATENT DOCUMENTS

| | | | |
|---|---|---|---|
| 3,219,610 | 11/1965 | Tillson | 260/29.6 |
| 3,402,158 | 9/1968 | Santaniello | 526/327 |
| 3,470,126 | 9/1969 | Sekmakas | 526/327 |
| 3,624,058 | 11/1971 | Jorgensen | 524/561 |
| 3,900,663 | 8/1975 | Barabas | 428/254 |
| 4,059,552 | 11/1977 | Zweigle | 260/29.6 |
| 4,100,133 | 7/1978 | Emmons | 428/522 |
| 4,141,868 | 2/1979 | Emmons | 526/283 |
| 4,144,212 | 3/1979 | Linder | 526/282 |
| 4,248,985 | 2/1981 | Ohishi | 526/327 |

Primary Examiner—Paul R. Michl

[57] ABSTRACT

An emulsion polymerized latex copolymer used as a binder in paper-coating compositions with improved dry and wet binding strength comprising an ester of an ethylenically unsaturated carboxylic acid and a saturated alcohol and a hetero-unsaturated monomer selected from the group consisting of allyl acrylate, allyl methacrylate, crotyl acrylate or crotyl methacrylate. A paper-coating composition in the form of an aqueous dispersion comprising a pigment and said emulsion polymerized latex copolymer is further characterized in that said pigment is present in an amount from about 99 to about 77 weight percent based on total dry solids. A coated paper article in the form of a fibrous sheet coated on at least one surface with the paper-coating composition is also provided.

8 Claims, No Drawings

STYRENE-ACRYLIC LATEX CONTAINING A HETERO-UNSATURATED MONOMER AND PAPER-COATING COMPOSITIONS PRODUCED THEREFROM

CROSS-REFERENCE TO RELATED APPLICATION

This is a continuation-in-part of application Ser. No. 384,812, filed June 3, 1982, now abandoned.

BACKGROUND OF THE INVENTION

This invention generally relates to an emulsion polymerized latex copolymer used as a binder in paper-coating compositions. More particularly, the invention relates to paper-coating compositions containing such latex and to papers coated with such paper-coating compositions.

Colloidally stable aqueous dispersions of polymers, which dispersions are typically referred to in the art as latexes, are generally known to be useful alone and in various formulations as coatings and impregnants for various substrates. A wide variety of such latexes of differing homopolymeric and copolymeric compositions have been developed with specific chemical and/or mechanical properties for particular end-use applications. Specifically, many latexes have been developed for use in paper-coating compositions. Paper coating compositions are generally combinations of a binder (latex and/or "natural" binder) and a pigment. Paper-coating compositions are applied to the surface of paper in order to give the paper greater stiffness, opacity, whiteness, brightness, gloss, smoothness and/or ink receptivity.

Latexes employing a monovinylidene aromatic monomer such as styrene and an aliphatic conjugated diene such as butadiene have been very popular for the production of latexes, especially those designed for paper-coating compositions. In these compositions, butadiene acts somewhat as a cross-linking agent, giving the latexes excellent properties. Recently, attempts have been made to produce paper-coating latexes which do not include significant amounts of butadiene. Specifically, attempts have been made to produce latexes from acrylic esters. Since the monomers in these formulations do not naturally cross-link the resulting polymer latexes, it is necessary to introduce a separate cross-linking agent such as divinyl benzene. While the performance of these latexes (with cross-linking agent) might be expected to be equivalent with styrene/butadiene latexes, they are in fact considerably inferior in performance. Specifically, these latexes suffer from poor dry and wet binding strength.

Since price projections for these acrylic monomers are favorable, and since their polymers have better light stability and age stability than styrene/butadiene polymers, it would be desirable to have an acrylic latex which does not contain an aliphatic conjugated diene, but which has performance in paper-coating compositions equal to formulations containing an aliphatic conjugated diene.

SUMMARY OF THE INVENTION

The present invention provides for an emulsion polymerized latex copolymer used as a binder in paper coating compositions with improved dry and wet binding strengths. The latex copolymer comprises (a) an ester of an ethylenically unsaturated carboxylic acid and a saturated alcohol and (b) a hetero-unsaturated monomer selected from the group consisting of an allyl acrylate or allyl methacrylate in an amount from about 0.05 to about 3.0 percent based on total monomer weight or a crotyl acrylate or crotyl methacrylate in an amount from about 0.20 to about 5.0 percent based on total monomer weight. In a preferred embodiment the (a) monomer is an ester of acrylic acid or methacrylic acid with a $C_1$ to $C_9$ saturated alcohol. Also the latex copolymer can additionally comprise monovinylidene aromatic monomers and ethylenically unsaturated carboxylic acid monomers.

The present invention further provides for a paper-coating composition in the form of an aqueous dispersion comprising a pigment, and an emulsion polymerized latex copolymer comprising (a) an ester of an ethylenically unsaturated carboxylic acid and a saturated alcohol, and (b) a hetero-unsaturated monomer selected from the group consisting of an allyl acrylate or allyl methacrylate in an amount from about 0.05 to about 3.0 percent based on total monomer weight or a crotyl acrylate or crotyl methacrylate in an amount of from about 0.20 to about 5.0 percent based on total monomer weight; the composition is further characterized in that the pigment is present in an amount from about 99 to about 77 weight percent based on total dry solids. The pigments employed can be a mineral filler, a plastic filler or a mixture thereof.

Still further, the present invention provides for a coated paper article in the form of a fibrous sheet coated on at least one surface with a paper-coating composition comprising a pigment, and an emulsion polymerized latex copolymer comprising (a) an ester of an ethylenically unsaturated carboxylic acid and a saturated alcohol, and (b) a hetero-unsaturated monomer selected from the group consisting of an allyl acrylate or allyl methacrylate in an amount from about 0.05 to about 3.0 percent based on total monomer weight or a crotyl acrylate or crotyl methacrylate in an amount from aout 0.20 to about 5.0 percent based on total monomer weight; the composition is further characterized in that the pigment is present in an amount from about 99 to about 77 weight percent based on total dry solids.

DETAILED DESCRIPTION OF THE INVENTION

Preparation of the latexes of the invention requires the use of an ester of an ethylenically unsaturated carboxylic acid and a saturated alcohol, and a heterofunctional monomer containing both vinyl and either allyl or crotyl unsaturation. Though not required, these latexes preferably also include a monovinylidene aromatic monomer, an ethylenically unsaturated carboxylic acid, and an ester of an ethylenically unsaturated carboxylic acid and a $C_{10}$ to $C_{25}$ saturated alcohol. These latexes are produced via conventional emulsion polymerization techniques and are utilized in conventional paper-coating formulations.

Esters of ethylenically unsaturated carboxylic acids and saturated alcohols suitable for use in the invention include esters which are addition polymerizable in an emulsion system. Polymers composed primarily of soft esters, i.e., those esters which if homopolymerized would have a glass transition temperature ($T_g$) of less than about 25° C. (298° K.), exhibit dramatic increase in both wet and dry pick resistance when prepared and used according to the invention. Polymers composed primarily of hard esters, i.e., those esters which if homopolymerized would have a $T_g$ of greater than about 25° C., exhibit less improvement in pick resistance than the soft esters, but it is with the hard esters that improvement is most needed. Prior art paper-coating compositions made with soft polymers typically have reasonably good pick resistance, but improvements are commercially desirable. However, compositions made with hard polymers (chosen because of the stiffness they impart to the coated paper) generally have very poor pick resistance, and any improvement is very significant. Thus, although the hard polymers have less improvement in pick resistance, their smaller improvement is as important or more important than the greater improvement shown by the soft polymers. Examples of suitable esters include acrylates such as methyl acrylate, ethyl acrylate, n- and iso-propyl acrylate, n-, iso-, sec- and tert-butyl acrylate, hexyl acrylate, cyclohexyl acrylate, 2-ethylhexyl acrylate and butyl chloracrylate, and methacrylates such as methyl methacrylate, ethyl methacrylate, n- and iso-propyl methacrylate, n-, iso-, sec- and tert-butyl methacrylate, hexyl methacrylate, cyclohexyl methacrylate, 2-ethylhexyl methacrylate and lauryl methacrylate. Mixtures of the esters may be used. Of these esters, butyl acrylate is especially preferred.

For the most part, the esters used in the invention are desirably those formed from $C_1$ to $C_9$ saturated alcohols. However, it is optional, but desirable, to have as a minor proportion of the ester charge, an ester formed from a $C_{10}$ to $C_{25}$ saturated alcohol.

The presence of a long chain ester, i.e., an ester of an ethylenically unsaturated carboxylic acid and a $C_{10}$ to $C_{25}$ saturated alcohol, increases the wet binding strength of paper-coating compositions made with the latex, without sacrificing dry binding strength. An especially preferred ester in this category is lauryl methacrylate.

The latexes of the invention also require a hetero-unsaturated monomer. By "hetero-unsaturated" is meant a monomer having at least two addition polymerizable double bonds. The hetero-unsaturated monomer will have one vinyl bond and one crotyl or allyl bond. In a preferred embodiment, the hetero-unsaturated monomer is an ester of an unsaturated alcohol and an unsaturated carboxylic acid. In a more preferred embodiment, the hetero-unsaturated compound is allyl methacrylate, allyl acrylate, crotyl methacrylate, or crotyl acrylate. The allyl acrylate or allyl methacrylate is preferably present in an amount from about 0.05 to about 3.0 percent based on total monomer weight while the crotyl acrylate or crotyl methacrylate is preferably present in an amount from about 0.20 to about 5.0 percent based on total monomer weight.

Though not required, the use of a monovinylidene aromatic monomer, an ethylenically unsaturated carboxylic acid, and an ester of an ethylenically unsaturated acid and a $C_{10}$ to $C_{25}$ saturated alcohol, is preferred.

The presence of a monovinylidene aromatic monomer is useful for increasing the $T_g$ of the latex. Its inclusion is desirable when a relatively stiff coated product is desired.

Suitable monovinylidene aromatic monomers useful in the invention include those monomers wherein a radical of the formula:

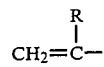

(wherein R is hydrogen or a lower alkyl such as an alkyl having from 1 to 4 carbon atoms) is attached directly to an aromatic nucleus containing from 6 to 10 carbon atoms, including those wherein the aromatic nucleus is substituted with alkyl or halogen substituents. Typical of these monomers are styrene; α-methylstyrene; ortho-, meta- and para-methylstyrene; ortho-, meta- and para-ethylstyrene; o,p-dimethylstyrene; o,p-diethylstyrene; ispropylstyrene, o-methyl-p-isopropylstyrene; p-chlorostyrene; p-bromostyrene; o,p-dichlorostyrene; o,p-dibromostyrene; vinylnaphthalene; diverse vinyl (alkylnaphthalenes) and vinyl (halonaphthalenes) and comonomeric mixtures thereof. Because of considerations such as cost, availability, ease of use, etc., styrene and vinyltoluene are preferred and styrene is especially preferred as the monovinylidene aromatic monomer. In a preferred embodiment, a monovinylidene aromatic monomer and a soft ester of an ethylenically unsaturated carboxylic acid and a saturated alcohol are copolymerized to form a polymer which is harder than the ester but softer than the aromatic monomer.

The presence of an ethylenically unsaturated carboxylic acid enhances the processability and the colloidal stability of the resulting latex. In some instances the acid also provides increased adhesion to a substrate to which the latex is applied. Examples of suitable acids include acrylic acid, methacrylic acid, itaconic acid, crotonic acid, 2-chloroacrylic acid, 2-bromoacrylic acid, 3-chloroacrylic acid, 2,3-dichloroacrylic acid, 3,3-dichloroacrylic acid, 2-phenolacrylic acid, 3-phenolacrylic acid, vinylbenzoic acid, isopropenolbenzoic acid and the like. Of these acids, itaconic acid is especially preferred.

The ester of an ethylenically unsaturated carboxylic acid and a saturated alcohol, preferably in combination with a monovinylidene aromatic monomer, makes up the bulk of the polymer, with the remaining ingredients being present in minor proportion. The proportions of the monovinylidene aromatic monomer and the ester should be adjusted to give the coating compositions made with the latex optimum performance. Three properties particularly controllable by varying the monovinylidene aromatic monomer ester ratio are the glass transition temperature and the dry and wet pick resistance. Generally, the ester will be present at from about 30 to about 100 percent, preferably about 40 to about 80 percent, and most preferably from about 45 to about 70 percent by weight, based on the total monomer weight excluding the weight of the heterofunctional monomer. Generally, the monovinylidene aromatic monomer will be present in an amount from about 0 to about 70 percent, preferably from about 20 to about 60 percent, and most preferably from about 30 to about 55 percent based on total monomer weight excluding the weight of the heterofunctional monomer.

The hetero-unsaturated monomer should be present in an amount to obtain an optimum combination of dry and wet pick resistance. It has been found that when allyl acrylate or allyl methacrylate are employed the preferred range is from about 0.05 to about 3.0 percent by weight hetero-unsaturated monomer based on the total monomer weight. The more preferred range being from about 0.1 to about 2.0 percent gives an excellent balance in properties for coating paper such as dry and wet pick strengths, gloss and brightness. Alternatively, where crotyl acrylate or crotyl methacrylate are employed a higher and broader range has been found to give the best results. Although the mechanism is not completely understood, it has been observed that the crotyl acrylate and crotyl methacrylate do not cause the latex to swell when admixed. This lack of swelling signifies the absence of sufficient crosslinking. The crotyl compounds are believed to instead provide strength by their extensive branching. Thus a higher and broader range is employed to take advantage of the crotyl compound's physical effect on the latex system. Preferably from about 0.20 to about 5.0 percent by weight hetero-unsaturated monomer based on the total monomer weight. The more perferred range for crotyl acrylate and crotyl methacrylate being from about 0.6 to about 4.0 percent. The optimum proportion of hetero-unsaturated monomer, however, may vary depending upon the specific latex formulation to which it is added and upon the specific hetero-unsaturated monomer used, as was previously indicated. The ranges as taught above for the specified monomers are demonstrated in Tables I–IV which follow.

As previously indicated the presence of an ethylenically unsaturated carboxylic acid is optional, but preferred. When used, it should be present in a concentration such that the latex has increased colloidal stability. Generally, the latex will have the acid present in a concentration of about 0 to about 10 percent, preferably about 2 to about 5 percent based on total monomer weight.

As indicated above, the presence of an ester of an ethylenically unsaturated acid and a $C_{10}$–$C_{25}$ saturated alcohol as part of the ester charge is optional but greatly preferred. This long chain ester should be added as part of the monomer charge in a concentration such that the wet pick resistance is substantially increased without substantially decreasing the dry pick resistance. Desirably, the long chain ester is present in a concentration to increase the wet pick resistance by at least 20 percent. Generally, the long chain ester will be present at from about 0.1 to about 20 percent, preferably about 0.5 to about 10 percent, and most preferably from about 1 to about 5 percent by weight, based on the total monomer weight.

In addition to the hereinbefore described monomers, the monomer charge employed to form the above-described latex can also, optionally, contain one or more other monomers which have only one polymerizable double bond, and are addition polymerizable with those required monomers. Examples of such suitable optional monomers include nitriles of the above-described monoethylenically unsaturated carboxylic acids (e.g., acrylonitrile and methacrylonitrile) as well as vinyl halide and vinylidene halide monomers, and the like. The amount of such optional monomers employed in the latex is not particularly critical as long as the amount thereof is not so much as to cause the latex to become deficient in performance, specifically wet and dry pick resistance. Importantly, these optional monomers may not impart substantial cross-linking to the latex. Thus, almost all compounds having more than one addition polymerizable double bond are not generally suitable for use in significant concentrations as optional monomers.

While the total amount of the aforementioned optional monomers employed in preparing the latex may range from 0 to about 50 weight percent, it is generally preferable to employ such monomers at a level of from 0 to about 10, most preferable from 0 to about 5 weight percent, based upon the total weight of the monomer charge employed in preparing the latex.

The preparation of the latexes of the invention is conveniently conducted pursuant to well-known conventional emulsion polymerization techniques. Thus, for example, the monomer charge desired to be employed is dispersed in an aqueous medium with agitation and with the aid of from about 0.1 to about 5 weight percent (based upon the monomer charge) of conventional anionic and/or nonionic emulsifiers (e.g., potassium, N-dodecyl sulfonate, sodium isooctobenzene sulfonate, sodium laurate, nonylphenol ethers of polyethylene glycols and the like) and thereafter polymerizing the resulting aqueous dispersion.

Conventional emulsion polymerization catalysts can be employed in the foregoing polymerization. Specific examples thereof include peroxides such as hydrogen peroxide, t-butyl hydroperoxide, cumene hydroperoxide; persulfates such as sodium persulfate, potassium persulfate and ammonium persulfate; and azo compounds. Typically, such catalyst are employed in an amount ranging from about 0.01 to about 5 weight percent based upon the monomer weight. In general, the polymerization is conducted at a temperature of from about 30° to about 100° C., and at a pH of from about 2 to about 8.

While potentially useful, the use of chain transfer agents such as N-dodecylmercaptan, bromoform and carbon tetrachloride, is not recommended.

Following completion of the polymerization, the solids content of the resulting latex can be adjusted to the level desired by adding water thereto or by distilling water therefrom. Generally, the desired polymer solids content will be from about 20 to about 65 weight percent, and such solids content is typically obtainable directly from the instant polymerization process without the need for any such further adjustment.

Following the preparation, the resulting latexes can be advantageously employed in a wide variety of end use applications, and in such instances latexes are employed pursuant to known techniques and procedures which are conventionally employed with other types of latexes. In particular, the latexes of the invention are suitable for use in paper-coating compositions.

The term "coating color" is often applied in the art to aqueous paper-coating compositions comprising a binder and a pigment. In the coating colors of the invention, the binder and the pigment are mixed in such proportions that, for each 100 parts by weight of dry pigment, from about 1 to about 30, preferaly from about 4 to about 25 parts by weight on a dry basis of binder are present in the mixture. On a weight percent basis, these proportions would translate to an amount of pigment of from about 99 to about 77 weight percent and preferably from about 96 to about 80 weight percent based on total dry solids, respectively. The latex disclosed herein can be the sole binder employed in the coating colors of the invention, or other binders known in the art (e.g., other latexes or natural binders such as casein, protein, starch, etc.) can be used in conjunction with the latexes of the invention.

The total solids content of the coating colors of the invention does not differ substantially from that in conventional coating colors, and depends largely on the equipment being used to coat the composition onto the paper. Generally, it is desirable to have from about 30 to about 80 percent, preferably about 40 to about 70 percent total solids in the paper coating composition.

Pigments which can be employed in the coating compositions of the invention include known mineral pigments, plastic pigments and mixtures thereof.

Any mineral pigment suitable for use in conventional mineral pigmented coating compositions can be employed in the paper-coating compositions of the invention. Examples of such suitable mineral pigments for use in the coating compositions of the invention include finely divided clays (especially of a kaolin type), calcium carbonate, titanium dioxide, satin white, etc. Other materials such as talc, blanc fixe, ochra, carbon black, aluminum powder and other pigment or filler material can be employed in minor amounts in conjuction with the aforementioned mineral pigments.

Plastic pigments suitable for use in the aqueous paper-coating compositions of the invention include those known to be useful in plastic pigmented coatings, such as those described in U.S. Pat. No. 3,949,138. Such plastic pigments are generally characterized as plastic, polymeric particles which have a number average particle diameter of from about 0.3 to about 0.8 micrometers and are not film-forming at temperatures and pressures selected to dry or finish the coated paper. By "nonfilm-forming" is meant that the plastic particles do not coalesce to form a film at ambient temperature or at temperatures and pressures selected to dry or finish the coated article. Other plastic pigments suitable for use in the aqueous paper coating compositions of the invention include those described in U.S. Pat. Nos. 3,968,319; 3,293,144 and 3,988,522.

The coating colors of the invention can optionally contain other additives such as thickeners (e.g., alginic acid or carboxymethylcellulose) and curing agents (e.g., melamine formaldehyde resins, urea formaldehyde resins and glyoxal) to achieve specific coating properties. When thickeners and/or curing agents are employed, they generally constitute individually, from about 1 to about 5 percent of the total binder weight on a dry basis.

The aforementioned components can be combined to form the coating colors of the invention in any convenient manner. As a general rule, however, it is convenient and preferable to disperse the pigment (or pigment mixture) and other powdery components in water and adjust the pH of the resulting dispersion into a value between about 6 and about 9 before mixing such dispersion with the latex. The dispersion temperature at the time of the latex addition is not critical; but, it is usually good practice not to add the latex to a mixture about 65° C.–70° C. This will help to prevent the formation of a film or skin on the surface of the pigment mixture. Tetrasodiumpyrophosphate is often used as a dispersing aid, particularly where mineral pigments constitute all or a portion of the pigment or pigment mixture.

The coating colors of the invention are conveniently applied to the paper by conventional means such as letter-press print roll coater, off-set roll coater, size press, air knife or blade coater. It is good practice to not excessively heat the coating colors of the invention during application. The traditional methods recognized in the art of paper-coating are preferred with temperatures not in excess of 80° C. during application.

After application, the coating is dried by any convenient method. Generally, however, drying is accomplished by causing a current of air to impinge upon the surface of the coated material. The temperature of the air may vary up to about 320° C., but the duration of contact is such that the coating is not heated to above about 100° C.

After drying, the coated paper product can be finished pursuant to processes conventionally employed in the art such as gloss calendering, super calendering and the like, and can be subsequently printed in any desirable conventional fashion. However, in this regard, it should be noted that a particular advantage of the present invention is that the paper-coatings thereof exhibit improved adhesion of the paper-coating pigment to paper substrate relative to comparable coatings employing conventional acrylic latexes. Thus, papers coated with the coating compositions of the invention can be printed with relatively viscous inks at relatively high speeds.

Other aspects of the invention will be apparent from the following examples. In the examples all parts and percentages are by weight unless otherwise specified.

METHODS USED IN THE EXAMPLES

Coating Compositions

Unless otherwise specified, the latexes are blended with a No. 1 clay (Hydrafine, available from J. M. Huber Corp., Borger, TX, USA) dispersion prepared by mixing 100 parts clay, 0.1 part tetrasodium phosphate and sufficient water to yield a 70 percent dispersion. For wet and dry pick resistance, 10 parts (solids) latex are blended with 100 parts (solids) clay dispersion to give a 47 percent total solids coating composition. For stiffness and optical properties, 18 parts (solids) latex are blended with 100 parts (solids) of clay dispersion to produce a 47 percent total solids coating composition. Unless otherwise noted the coating compositions are coated onto paper samples at 15 lbs/ream with a Meyer Rod, dried at 105° C. and calendered at 1200 pli, 4 nips.

Dry and Wet Pick Resistance

Dry and wet pick resistance are measured with an IGT printability tester according to ASTM T-499 su-64. Results are reported in feet/minute for a specified ink number. For a given ink number, larger speed values indicate better results. For a given coating sample, as ink numbers go down, speed values will increase.

Gloss

Gloss is measured on a Gardner Multipurpose reflectometer. Results are reported as percent reflectance for a specified angle of incidence. Larger values mean greater gloss.

Brightness

Brightness is measured on a Gardner Brightness Meter. Larger values mean greater brightness.

K & N Ink Receptivity

The ink receptivity of the coatings was determined by placing a smear of K & N testing ink on the sheet for 2 minutes, after which the ink is removed and the brightness of the inked area recorded. Ink receptivity values are reported as a percent drop in sheet brightness.

Stiffness

For stiffness measurements, papers were coated on both sides. Stiffness is measured on a Clark Softness- Stiffness Tester. Results are reported in centimeters. Larger values mean greater stiffness.

Heliotest Printability

Heliotest printability is a measure of smoothness of the coated paper which was developed by the Paper Institute of France. It consists of a printing disc that can be mounted on an IGT Pick tester. The disc has been etched with cells varying from 80 to 40 microns in a strip of 100 mm long and 7 mm wide. The cells are filled with ink via a doctor blade and then transferred or printed on the coated paper test strip. The IGT sector, to which the test strip is mounted, is equipped with the standard hard paper backing. Printing pressure is maintained at 40 Kg/cm². Printing speed accelerates, and starts at the small cell size (40 microns) at about 160 ft/min and increases to approximately 430 ft/min at the 80 micron cell size. The numerical value given as the test result is the length of print in mm required to accumulate 20 missing dots. Counting starts at the larger cell size. Larger values mean better results. An average value of 7 test strips per coating formulation is used.

EXAMPLE 1

Using conventional emulsion polymerization techniques, 49 parts vinyl acetate, 49 parts butyl acrylate, and 2 parts acrylic acid are polymerized to yield a 48 percent solids latex and is filtered through a 325 mesh screen. In a similar manner, several more latexes are prepared, each having varying amounts of allyl methacrylate (AMA) or crotyl methacrylate (CMA). A clay dispersion is prepared from 100 parts English clay (Dinkey "A," available from English China Clays Ltd., Cornwall, UK), 0.1 part sodium polyacrylate (Dispec N-40, available from Allied Colloid Inc., Fairfield, NJ, USA), 0.2 part inorganic dispersant (Calgon T, available from Calgon Corp., Pittsburg, PA, USA), 0.3 part caustic soda, and sufficient water to yield a 70 percent solids dispersion. A coating composition is prepared by mixing 100 parts of clay dispersion, 0.5 part carboxymethyl cellulose and 5 parts latex to yield a 47 percent solids composition. The compositions are coated onto paper with a laboratory scale blade coater, and the coated samples are calendered at 400 pli and 4 nips. The finished samples are then evaluated for smoothness (Heliotest) and dry pick resistance (IGT). The results are shown in Table I.

TABLE I

| Sample | Hetero-functional Type | (Wt %) | Thickener[1] (Wt %) | Coat Wt. lbs/ream | Heliotest mm/20 dots | Dry Pick #1 Ink (Ft/Min.) | 75° Gloss | Brightness |
|---|---|---|---|---|---|---|---|---|
| 1* | AMA | 0 | 0.5 | 4.9 | 48.7 | 127 | 34.5 | 72.8 |
| 2 | AMA | 0.1 | 0.5 | 4.8 | 49.8 | 184 | 36.1 | 72.6 |
| 3 | AMA | 0.3 | 0.5 | 5.3 | 41.4 | 167 | 34.5 | 72.4 |
| 4 | AMA | 0.5 | 0.5 | 5.4 | 45.8 | 161 | 34.7 | 73.0 |
| 5 | AMA | 1.0 | 0.5 | 5.3 | 42.4 | 107 | 35.4 | 72.4 |
| 6 | AMA | 0.5 | 0.25 | 5.6 | 66.2 | 133 | 37.4 | 72.3 |
| 7 | AMA | 0.5 | 0 | 6.0 | 86.2 | 109 | 39.3 | 73.7 |
| 8 | CMA | 2.0 | 0.5 | 5.5 | 60.1 | 158 | 35.4 | 72.3 |

*Not an example of the invention.
[1]Carboxymethyl cellulose.

EXAMPLE 2

Using conventional emulsion polymerization conditions and techniques, varying ratios of styrene (S), butyl acrylate (BA), itaconic acid (IA) and allyl methacrylate (AMA) are polymerized in a continuous addition batch reactor equipped with a heat source, stirrer and nitrogen purge, to yield a 48 percent solids latex. The latexes are formulated with clay, coated onto paper, and evaluated, as described in *Methods Used in the Examples,* supra. The results are shown in Table II.

TABLE II

| Sample | S/BA/IA/AMA | Dry IGT Pick Ink No. | Ft/min. | Wet Pick | 75° Gloss | Brightness | K & N Ink (% drop) |
|---|---|---|---|---|---|---|---|
| 2-1* | 41/56/3/0 | 5 | 233 | 40 | 80 | 77.0 | 13.4 |
| 2-2 | 41/56/3/0.55 | 5 | 314 | 30 | 79 | 77.0 | 17.7 |
| 2-3* | 35/62/3/0 | 5 | 214 | 35 | 79 | 77.1 | 17.7 |
| 2-4 | 35/62/3/0.55 | 5 | 339 | 25 | 79 | 77.0 | 16.9 |
| 2-5* | 29/68/3/0 | 5 | 215 | 30 | 80 | 77.5 | 18.2 |
| 2-6 | 29/68/3/0.55 | 5 | 355 | 25 | 80 | 77.4 | 16.5 |
| 2-7* | 40/56/4/0 | 5 | 260 | 30 | 80 | 76.6 | 15.4 |
| 2-8 | 40/56/4/0.55 | 5 | 326 | | | | |
| 2-9* | 51/46/3/0 | 3 | 343 | | | | |
| 2-10 | 51/46/3/0.55 | 3 | 381 | | | | |

*Not an example of the invention.

EXAMPLE 3

In a manner similar to Example 2, a series of latexes is prepared with 35 parts styrene, 62 parts butyl acrylate and varying amounts of allyl methacrylate and crotyl methacrylate. The results are shown in Table III.

TABLE III

| Sample | Hetero-unsaturated Type | Parts | #5 Ink, Ft/min. | Wet Pick | 75° Gloss | Brightness | K & N Ink (% drop) |
|---|---|---|---|---|---|---|---|
| 3-1* | AMA | 0 | 230 | 30 | 80 | 76.7 | 12.9 |
| 3-2 | AMA | 0.11 | 270 | 30 | 79 | 76.7 | 13.0 |
| 3-3 | AMA | 0.33 | 300 | 25 | 80 | 76.4 | 12.6 |
| 3-4 | AMA | 0.55 | 300 | 40 | 79 | 76.4 | 12.3 |

TABLE III-continued

| Sample | Hetero-unsaturated Type | Parts | #5 Ink, Ft/min. | Wet Pick | 75° Gloss | Brightness | K & N Ink (% drop) |
|---|---|---|---|---|---|---|---|
| 3-5 | AMA | 0.77 | 300 | 30 | 80 | 76.2 | 11.7 |
| 3-6 | AMA | 1.1 | 310 | 30 | 81 | 75.8 | 11.5 |
| 3-7 | AMA | 2.2 | 260 | 15 | 81 | 75.4 | 14.0 |
| 3-8* | CMA | 0 | 260 | 45 | 51.0 | 77.1 | 21.6 |
| 3-9 | CMA | 0.6 | 290 | 50 | 51.8 | 77.0 | 21.2 |
| 3-10 | CMA | 0.84 | 300 | 55 | 51.6 | 77.0 | 20.9 |
| 3-11 | CMA | 1.2 | 370 | 45 | 51.9 | 76.9 | 19.5 |
| 3-12 | CMA | 1.8 | 410 | 55 | 51.9 | 77.0 | 20.3 |
| 3-13 | CMA | 2.4 | 370 | 50 | 51.4 | 76.9 | 20.8 |
| 3-14 | CMA | 3.0 | 390 | 30 | 53.1 | 77.0 | 20.3 |

*Not an example of the invention.

EXAMPLE 4

In a manner similar to Example 2, several latexes are made with varying amounts of styrene (S), butyl acrylate (BA), itaconic acid (IA), lauryl methacrylate (LMA), and allyl methacrylate (AMA). The latexes are formulated, coated and evaluated. The results are shown in Table IV.

These results show that lauryl methacrylate enhances the wet pick resistance of the paper-coatings of the invention.

TABLE IV

| Sample | S/BA/IA/LMA/AMA | Dry Pick #6 Ink, Ft/min. | Wet Pick | 75° Gloss | Brightness | K & N Ink (% drop) |
|---|---|---|---|---|---|---|
| 1* | 35/62/3/0/0 | 250 | 30 | 79.1 | 73.2 | 16.9 |
| 2 | 32/62/3/3/0 | 270 | 60 | 79.8 | 73.2 | 18.7 |
| 3 | 32/62/3/3/0.55 | 370 | 60 | 79.5 | 73.2 | 16.0 |
| 4 | 35/62/3/0/0.55 | 390 | 30 | 80.0 | 72.8 | 16.2 |

*Not an example of the invention.

COMPARATIVE EXAMPLE 1

In a manner similar to Example 2, a series of latexes having 35 parts styrene (S), 62 parts butyl acrylate (BA), 3 parts itaconic acid (IA) and varying amounts of divinyl benzene (DVB) and iso-octyl thioglycollate (IOTG). The results are shown in Table V.

The results show that the practice of the invention and the use of divinyl benzene are not equivalent.

TABLE V

| DVB/IOTG | Dry Pick #5 Ink, Ft/Min. | Wet Pick | 75° Gloss | Brightness | K & N Ink (% drop) |
|---|---|---|---|---|---|
| 0/0* | 300 | 30 | — | — | — |
| 0.1/0* | 320 | 30 | 82.0 | 72.5 | 16.4 |
| 0.3/0* | 335 | 20 | 81.5 | 72.2 | 18.8 |
| 0.5/0* | 300 | 20 | 82.2 | 72.3 | 20.4 |
| 0.1/0.1* | 170 | 30 | 82.3 | 72.7 | 16.4 |
| 0.3/0.3* | 230 | 30 | 82.5 | 72.6 | 15.9 |
| 0.5/0.5* | 290 | 20 | 84.3 | 72.4 | 16.1 |
| Control Acrylic[(1)] | 433 | 25 | 82.7 | 72.2 | 16.4 |

*Not an example of the invention.
[(1)] 0.55 parts AMA, no DVB or IOTG.

What is claimed is:

1. A coated paper article in the form of a fibrous sheet coated on at least one surface with a paper-coating composition comprising a pigment, and an emulsion polymerized latex copolymer comprising (a) an ester of an ethylenically unsaturated carboxylic acid and a saturated alcohol, and (b) a hetero-unsaturated monomer selected from the group consisting of (1) an allyl acrylate or allyl methacrylate in an amount from about 0.05 to about 3.0 percent based on total monomer weight, or (2) a croytl acrylate or croytl methacrylate in an amount from about 0.20 to about 5.0 percent based on total monomer weight; said composition further characterized in that said pigment is present in an amount from about 99 to about 77 weight percent based on total dry solids.

2. An article as recited in claim 1 wherein said pigment is a mineral filler, a plastic filler or a mixture thereof.

3. An article as recited in claim 1 wherein (a) has a $T_g$ of greater than about 25° C.

4. An article as recited in claim 1 wherein (a) is an ester of acrylic acid or methacrylic acid with a $C_1$ or $C_9$ saturated alcohol.

5. An article as recited in claim 1 wherein a major portion of (a) is an ester of acrylic acid or methacrylic acid with a $C_1$ to $C_9$ saturated alcohol, and a minor portion of (a) is an ester of acrylic acid or methacrylic acid with a $C_{10}$ to $C_{25}$ saturated alcohol.

6. An article as recited in claim 1 wherein said latex additionally comprises a monovinylidene aromatic monomer.

7. An article as recited in claim 1 wherein said latex additionally comprises an ethylenically unsaturated carboxylic acid.

8. An article as recited in claim 1 wherein (a) comprises a major portion of an ester of acrylic acid or methacrylic acid and a $C_1$ to $C_9$ saturation alcohol, and a minor proportion of an ester of acrylic acid or methacrylic acid and a $C_{10}$ to $C_{25}$; and the latex additionally comprises
 (1) an ethylenically unsaturated carboxylic acid; and
 (2) a monovinylidene aromatic monomer.

* * * * *

UNITED STATES PATENT AND TRADEMARK OFFICE
CERTIFICATE OF CORRECTION

PATENT NO. : 4,521,494

DATED : June 4, 1985

INVENTOR(S) : Inder Mani

It is certified that error appears in the above-identified patent and that said Letters Patent is hereby corrected as shown below:

Col. 2, line 22, please delete "of"; line 39, "aout" should read --about--.

Col. 4, line 14, "ispropylstyrene" should read --isopropylstyrene--.

Col. 5, line 16, "perferred" should read --preferred--.

Col. 6, bridging lines 21 and 22, "hydoperoxide" should read --hydroperoxide; line 24, "catalyst" should read --catalysts--; line 53, "preferaly" should read --preferably--.

Col. 7, bridging lines 16 and 17, "conjuction" should read --conjunction--.

Col. 11, Claim 1, line 67, in both instances, the word "croytl" should read --crotyl--.

Col. 12, Claim 4, line 25, please delete the second "or" and insert therefor --to--.

Signed and Sealed this

Twelfth Day of November 1985

[SEAL]

Attest:

Attesting Officer

DONALD J. QUIGG

Commissioner of Patents and Trademarks